(12) United States Patent
Bond et al.

(10) Patent No.: US 12,137,640 B2
(45) Date of Patent: Nov. 12, 2024

(54) SUSTAINABLE RESIDENTIAL YARD FLOOD IRRIGATION VALVE SYSTEM WITH CONTROLLER

(71) Applicant: Uniflood LLC, Mesa, AZ (US)

(72) Inventors: Dwight N. Bond, Mesa, AZ (US); Lisa J. Bond, Mesa, AZ (US); Gary M. Weber, Tempe, AZ (US)

(73) Assignee: Uniflood LLC, Mesa, AZ (US)

( * ) Notice: Subject to any disclaimer, the term of this patent is extended or adjusted under 35 U.S.C. 154(b) by 0 days.

(21) Appl. No.: 18/215,130

(22) Filed: Jun. 27, 2023

(65) Prior Publication Data

US 2023/0413744 A1 Dec. 28, 2023

Related U.S. Application Data

(60) Provisional application No. 63/427,560, filed on Nov. 23, 2022, provisional application No. 63/356,004, filed on Jun. 27, 2022.

(51) Int. Cl.
*A01G 25/16* (2006.01)
*G05B 15/02* (2006.01)

(52) U.S. Cl.
CPC .......... *A01G 25/16* (2013.01); *G05B 15/02* (2013.01)

(58) Field of Classification Search
CPC .. F16K 37/0083; F16K 31/042; F16K 37/005; F16K 37/0075; F16K 31/041;

(Continued)

(56) References Cited

U.S. PATENT DOCUMENTS

| 4,699,354 | A | | 10/1987 | Gibson | |
|---|---|---|---|---|---|
| 5,469,365 | A | * | 11/1995 | Diekema | G01R 21/133 340/870.03 |

(Continued)

FOREIGN PATENT DOCUMENTS

| CN | 107228198 | 10/2017 |
|---|---|---|
| CN | 207715780 | 8/2018 |

OTHER PUBLICATIONS

Watson, Henri, AutoValve, YouTube, Published Feb. 21, 2018: https://www.youtube.com/watch?v=HFzm0Fny7XA.

*Primary Examiner* — Darrin D Dunn
(74) *Attorney, Agent, or Firm* — Booth Udall Fuller, PLC; Kenneth C. Booth

(57) ABSTRACT

A sustainable residential yard flood irrigation valve safety system includes a lower bracket configured to couple to a water flood irrigation feed pipe, a mounting post extends from the lower bracket, a driver support arm pivotally attaches to the mounting post and supports a driver motor. The driver motor rotatably drives an arm through a universal joint pivotally attached to the driver motor and includes a slot configured to receive a manual twist handle of the water flood irrigation feed pipe's flood irrigation valve. An electronic controller associated with the driver motor regulates start and stop times for opening and closing the flood irrigation valve. A camera captures an image as evidence that the valve is open or closed and a water alarm notifies the electronic controller if either the valve does not close or the water level is too high. The electronic controller and drive motor are powered through solar power.

20 Claims, 9 Drawing Sheets

(58) Field of Classification Search
CPC .......... G05B 2219/2625; G05B 19/042; G05B 23/024; G05B 11/00; G05B 2219/24097; G05B 2219/40607; G05B 23/0205; A01G 25/00; A01G 25/165; A01G 25/06; E03B 1/04; E03B 7/071; G01R 21/133
See application file for complete search history.

(56) References Cited

U.S. PATENT DOCUMENTS

| | | | | |
|---|---|---|---|---|
| 6,109,827 | A * | 8/2000 | Holloway, Jr. | E02B 13/00 47/79 |
| 7,066,192 | B1 * | 6/2006 | Delaney | F16K 37/0075 137/271 |
| 8,838,413 | B2 * | 9/2014 | Genta | G05B 23/00 702/179 |
| 9,625,349 | B2 * | 4/2017 | Jensen | G05B 23/0264 |
| 10,039,242 | B1 | 8/2018 | Goldwasser | |
| 10,254,728 | B2 * | 4/2019 | Hill | A01G 25/167 |
| 10,524,430 | B1 * | 1/2020 | Nervino | A01G 25/167 |
| 10,966,380 | B1 | 4/2021 | Goldwasser | |
| 11,080,660 | B2 * | 8/2021 | Sundareswara | G06Q 10/20 |
| 11,506,075 | B2 * | 11/2022 | Sanchez Del Valle | F02C 9/00 |
| 11,530,531 | B2 * | 12/2022 | Poojary | E03B 7/072 |
| 2006/0124171 | A1 * | 6/2006 | Ghazarian | F17D 5/06 137/312 |
| 2010/0217443 | A1 * | 8/2010 | Hagler | F16K 5/0647 700/282 |
| 2011/0220206 | A1 * | 9/2011 | Cordle | F16K 37/0083 137/1 |
| 2014/0001383 | A1 * | 1/2014 | Staffiere | F16K 31/05 251/129.01 |
| 2015/0361630 | A1 * | 12/2015 | Appelboom | H01M 10/465 405/104 |
| 2016/0048135 | A1 * | 2/2016 | Hill | G05B 19/042 405/37 |
| 2017/0045896 | A1 * | 2/2017 | Atchley | F16K 37/005 |
| 2017/0314221 | A1 * | 11/2017 | Watson | E02B 7/34 |
| 2019/0235456 | A1 * | 8/2019 | Hill | A01G 25/167 |
| 2020/0409321 | A1 * | 12/2020 | Sanchez Del Valle | H02J 3/381 |
| 2021/0012638 | A1 * | 1/2021 | Jalilian | G08B 21/20 |
| 2021/0103006 | A1 * | 4/2021 | Menzel | G05B 19/00 |
| 2021/0180713 | A1 * | 6/2021 | Mariano | F16K 31/042 |
| 2021/0360884 | A1 * | 11/2021 | Woytowitz | H04L 67/125 |
| 2022/0147071 | A1 * | 5/2022 | Biffert | E03F 1/002 |
| 2022/0243838 | A1 * | 8/2022 | Wozniak | F16K 31/047 |
| 2022/0307618 | A1 * | 9/2022 | Verissimo | H02K 7/1004 |
| 2023/0003605 | A1 * | 1/2023 | Rasmussen | G08B 21/20 |
| 2023/0075157 | A1 * | 3/2023 | Liu | G01F 23/00 |
| 2023/0086588 | A1 * | 3/2023 | Carter | A01G 25/167 137/78.3 |

* cited by examiner

SUSTAINABLE RESIDENTIAL YARD FLOOD IRRIGATION VALVE SYSTEM WITH CONTROLLER

RELATED APPLICATIONS

This application claims priority to U.S. provisional patent application 63/356,004, filed Jun. 27, 2022 to Bond, et al., titled "Sustainable Residential Yard Flood Irrigation Valve System with Controller," and to U.S. provisional patent application 63/427,560, filed Nov. 30, 2022 to Bond, et al., titled "Sustainable Residential Yard Flood Irrigation Valve System with Controller," the entirety of the disclosures of each of which are hereby incorporated by this reference.

TECHNICAL FIELD

This document relates to a sustainable residential yard flood irrigation valve system with a controller that automatically adjusts when the water is on and off. More specifically, the present disclosure relates to a sustainable residential yard flood irrigation valve system with a controller that regulates, using solar energy, when each user receives water and creates a record of flood irrigation valve opens and closes at the assigned times with a high-water alarm to avoid overflowing.

BACKGROUND

Conventional residential yard flood irrigation systems include a manually operated valve that a user is required to manually rotate open and closed at assigned times. Those times, notoriously, are assigned at very inconvenient times for the user, sometimes in the middle of the night, in the middle of the work day, early in the morning, during meals, or any other time that might seem inconvenient because it interrupts something else the user wants to be doing other than stomping out in the water to open and close the irrigation water valve for flood irrigating the user's yard.

The water company typically provides water to the user's area at an assigned time, and each irrigation water recipient has an assigned time to open their assigned window of water to allow the water that is in their area to come into their yard. Unfortunately, however, due to the inconvenience of the process, users often open their valves early or late, forget to open their valves, or forget to close their valves at the assigned times, or, frankly, decide they need more water than was allocated for them and keep their valve open longer than their assigned time, taking water from others. When a valve is not opened on time or is not opened at all, or it is closed early, the water provided to the area often overflows into other yards potentially causing flooding if the yard has already been flood irrigated or receives too much overflow water. When a valve is opened early or closed late, or when someone forgets to close their valve, the water that should have gone to someone else comes to the user's yard instead, leaving others with less water in their yards. Often, other users are not even aware that someone else has taken some of the water they have paid for, or they realize it but with little or no recourse, or they are forced to track down who took their water and manually close the neighbor's valve for them. Annoyance with the manual systems for opening and closing gates and with the assignments at inconvenient hours is the number one complaint of recipients of residential flood irrigation and has been for decades.

SUMMARY

Aspects of the this disclosure relate to a sustainable residential yard flood irrigation valve safety system comprising a lower ring bracket sized to fit around an outer diameter of a water flood irrigation feed pipe of a traditional residential flood irrigation system, the lower ring bracket comprising at least one post receiver and a clamp configured to engage the water flood irrigation feed pipe, a mounting post engaged with the post receiver and extending upward from the lower ring bracket, the mounting post comprising a driver support arm pivotally attached to the mounting post and moveable between a retracted position and an extended position, a driver motor mounted to the driver support arm and configured to rotatably drive a first end of a driver arm removably coupled to the driver motor through a universal joint attached to the driver motor, wherein the driver arm comprises a slot at a second end configured to receive a manual twist handle of a flood irrigation valve of the traditional residential flood irrigation system and rotate the manual twist handle as the first end of the driver arm rotates, an electronic controller configured to receive commands through a wireless communication network and to selectively activate and deactivate the driver motor and to cause the driver motor to selectively rotate in both clockwise and counterclockwise rotational directions in response to the received commands in order to move the flood irrigation valve of the traditional residential flood irrigation system to either of a closed state and an open state, a camera, responsive to the electronic controller and coupled to the mounting post, the camera configured to capture at least one image of the flood irrigation valve at one or more predetermined select times in relation to the flood irrigation valve being moved toward at least its closed state, a water alarm configured, when the flood irrigation valve is open, to notify the electronic controller, the electronic controller further configured to: send a notice through the wireless communication network when the valve remains in its open state for a predetermined time after the driver motor selectively rotates to place the flood irrigation valve in the closed state, and automatically move the flood irrigation valve to its closed state when the water alarm indicates a water level about a water sensor has reached a predetermined height, and a solar panel configured to gather solar energy and store it in a battery associated with the electronic controller and the driver motor.

Particular embodiments may include one or more of the following features. At least one image is at least one of a video image and a still image. Each of the at least one image may be associated with a date and time stamp as evidence of the open state or closed state of the flood irrigation valve. The electronic controller may be further configured to send a notice through the wireless communication network when the valve is in its closed state and the water alarm indicates a water level about the water sensor has reached the predetermined height. When the electronic controller sends the notice that the valve is in its closed state and the water alarm indicates the water level about the water sensor has reached the predetermined height, the notice includes the at least one image. When the electronic controller sends the notice that the valve remains in its open state after the driver motor selectively rotated to place the flood irrigation valve in the closed state, the notice includes the at least one image evidencing whether the flood irrigation valve is releasing water.

Aspects of this disclosure relate to a sustainable residential yard flood irrigation valve safety system comprising a lower bracket configured to physically engage a water flood irrigation feed pipe of a traditional residential flood irrigation system, the lower bracket comprising at least one post receiver, a mounting post engaged with the post receiver and extending upward from the lower bracket, the mounting post comprising a driver support arm attached to the mounting post, a driver motor mounted to the driver support arm and configured to rotatably drive a first end of a driver arm removably coupled to the driver motor through a universal joint attached to the driver motor, wherein the driver arm comprises a slot at a second end configured to receive a manual twist handle of a flood irrigation valve of the traditional residential flood irrigation system and rotate the manual twist handle as the first end of the driver arm rotates, an electronic controller configured to receive commands through a wireless communication network and to selectively activate and deactivate the driver motor and to cause the driver motor to selectively rotate in both clockwise and counterclockwise rotational directions in response to the received commands in order to move the flood irrigation valve of the traditional residential flood irrigation system to either of a closed state and an open state, a camera, responsive to the electronic controller and coupled to the mounting post, the camera configured to capture at least one image of the flood irrigation valve at one or more predetermined select times in relation to the flood irrigation valve being moved at least toward its closed state, and a water alarm configured to notify the electronic controller when a water level about a water sensor associated with the water alarm has reached a predetermined height.

Particular embodiments may include one or more of the following features. The at least one image is at least one of a video image and a still image. Each of the at least one image may be associated with a date and time stamp as evidence of the open state or closed state of the flood irrigation valve. The lower bracket is sized to fit around an outer diameter of the water flood irrigation feed pipe. The driver support arm may be moveable between a retracted position and an extended position. The electronic controller may be further configured to send a notice through the wireless communication network when the valve remains in its open state for a predetermined time after the driver motor selectively rotates to place the flood irrigation valve in the closed state. When the electronic controller sends the notice that the valve remains in its open state for the predetermined time after the driver motor selectively rotates to place the flood irrigation valve in the closed state, the notice includes the at least one image. The electronic controller may be configured to automatically move the flood irrigation valve to its closed state when the water alarm indicates the water level about the water sensor has reached the predetermined height.

Aspects of this disclosure relate to a sustainable residential yard flood irrigation valve safety system comprising a lower bracket configured to positionally fix the sustainable residential yard flood irrigation valve safety system in relation to a water flood irrigation feed pipe of a traditional residential flood irrigation system, a mounting post extending upward from the lower bracket, the mounting post comprising a driver support arm attached to the mounting post, a driver motor coupled to the driver support arm and configured to rotatably drive a first end of a driver arm extending downward from the driver support arm, a second end of the driver arm configured to engage a manual twist handle of a flood irrigation valve of the traditional residential flood irrigation system and rotate the manual twist handle as the first end of the driver arm rotates, an electronic controller configured to selectively operate the driver motor to selectively rotate the driver motor in either a clockwise or a counterclockwise rotational direction to move the flood irrigation valve to either of a closed state or an open state, and a water alarm configured to indicate when a water level about a water sensor associated with the water alarm has reached a predetermined height and initiate a notice through the electronic controller that the water level has reached the predetermined height.

Particular embodiments may include one or more of the following features. A camera coupled to the mounting post and configured to capture at least one of a video image and a still image of the flood irrigation valve at one or more predetermined select times in relation to the flood irrigation valve being moved toward at least one of its open state and its closed state. The electronic controller may be further configured to send a notice through a wireless communication network when the valve remains in its open state for a predetermined time after the driver motor selectively rotates to place the flood irrigation valve in the closed state. When the electronic controller sends the notice that the valve remains in its open state for the predetermined time after the driver motor selectively rotates to place the flood irrigation valve in the closed state, the notice includes the at least one of the video image and the still image. The electronic controller may be configured to automatically move the flood irrigation valve to its closed state when the water alarm indicates the water level about the water sensor has reached the predetermined height. The driver support arm may be moveable between a retracted position and an extended position.

The foregoing and other aspects, features, and advantages will be apparent from the DESCRIPTION and DRAWINGS, and from the CLAIMS if any are included.

BRIEF DESCRIPTION OF THE DRAWINGS

Implementations will hereinafter be described in conjunction with the appended and/or included DRAWINGS, where like designations denote like elements, and.

DETAILED DESCRIPTION

Figure 1:
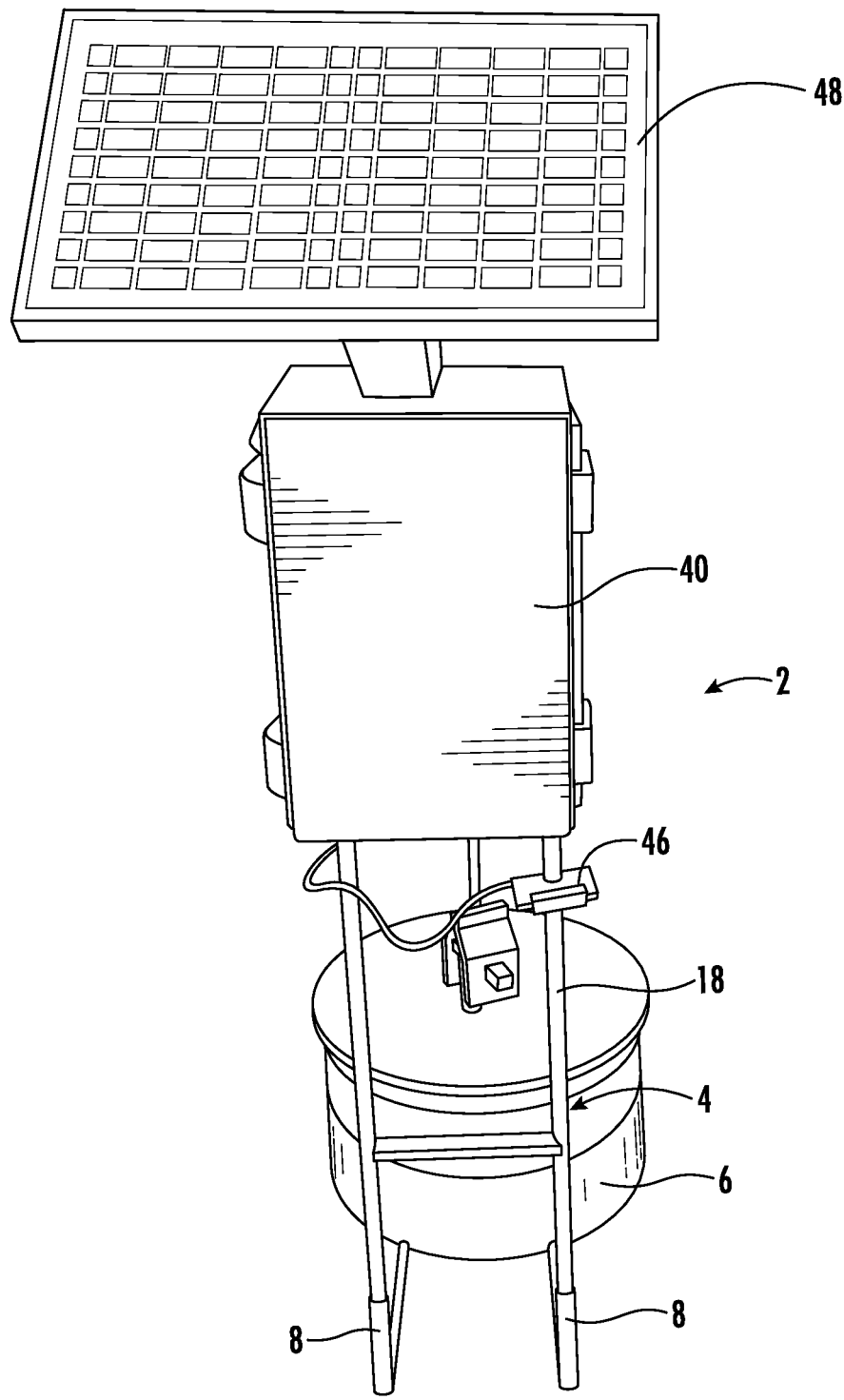
FIG. 1 is a rear view of a sustainable residential yard flood irrigation valve safety system unit.
Figure 2B:
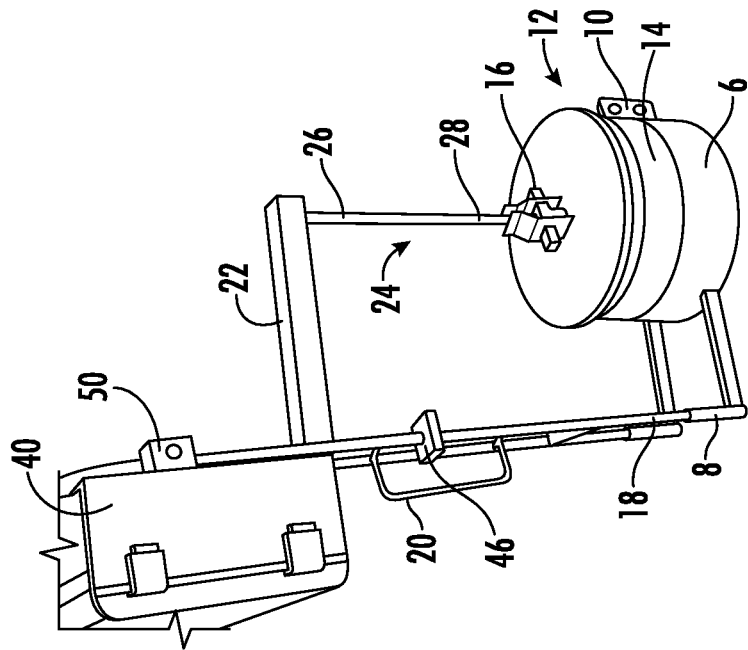
FIG. 2B is a side view of the sustainable residential yard flood irrigation valve safety system unit of FIG. 1 with the driver support arm raised.
Figure 2A:
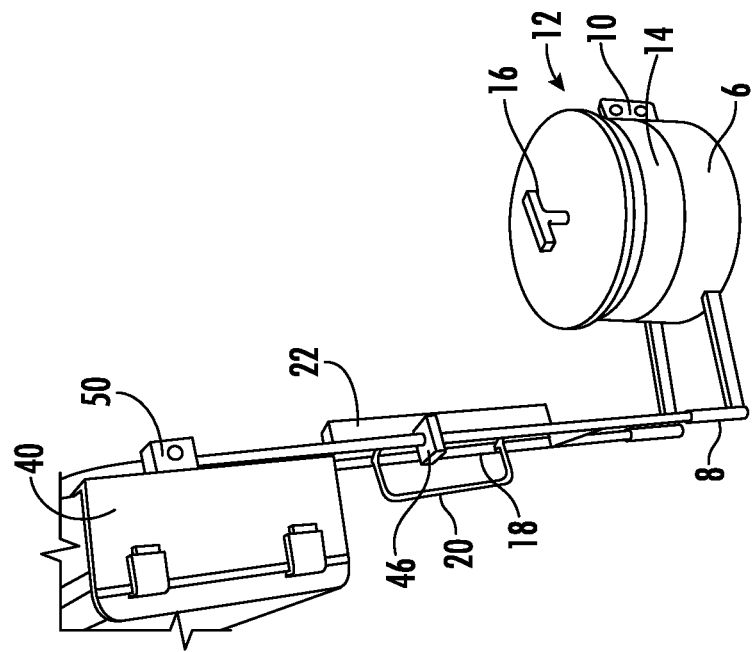
FIG. 2A is a side view of the sustainable residential yard flood irrigation valve safety system unit of FIG. 1 with the driver support arm lowered.
Figure 3:
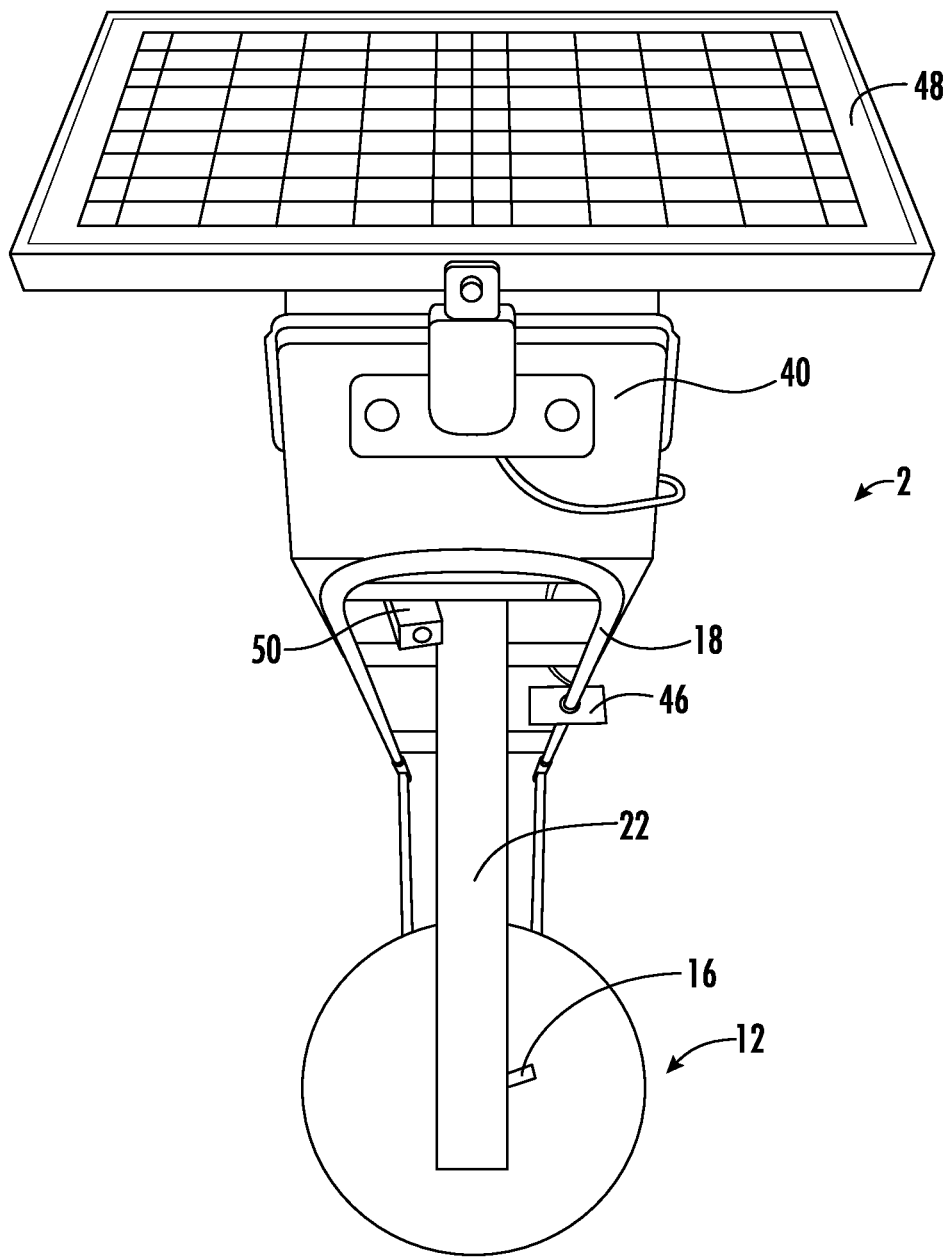
FIG. 3 is a top view of the sustainable residential yard flood irrigation valve safety system unit of FIG. 1.
Figure 4:
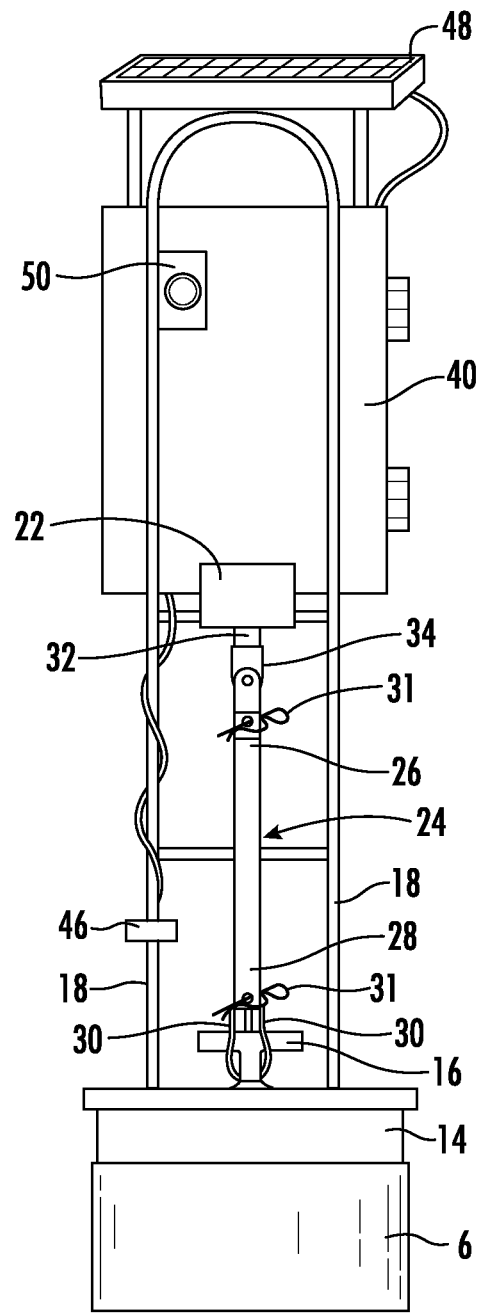
FIG. 4 is a front view of the sustainable residential yard flood irrigation valve safety system unit of FIG. 1.

Detailed aspects and applications of the disclosure are described below in the following drawings and detailed description of the technology. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the disclosure. It will be understood, however, by those skilled in the relevant arts, that embodiments of the technology disclosed herein may be practiced without these specific details. It should be noted that there are many different and alternative configurations, devices and technologies to which the disclosed technologies may be applied. The full scope of the technology disclosed herein is not limited to the examples that are described below.

The singular forms "a," "an," and "the" include plural referents unless the context clearly dictates otherwise. Thus, for example, reference to "a step" includes reference to one or more of such steps.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

Throughout the description and claims of this specification, the words "comprise" and "contain" and variations of the words, for example "comprising" and "comprises", mean "including but not limited to", and are not intended to (and do not) exclude other components.

As required, detailed embodiments of the present disclosure are included herein. It is to be understood that the disclosed embodiments are merely exemplary of the invention that may be embodied in various forms. Therefore, specific structural and functional details disclosed herein are not to be interpreted as limits, but merely as a basis for teaching one skilled in the art to employ the present invention. The specific examples below will enable the disclosure to be better understood. However, they are given merely by way of guidance and do not imply any limitation.

The present disclosure may be understood more readily by reference to the following detailed description taken in connection with the accompanying figures and examples, which form a part of this disclosure. It is to be understood that this disclosure is not limited to the specific materials, devices, methods, applications, conditions, or parameters described and/or shown herein, and that the terminology used herein is for the purpose of describing particular embodiments by way of example only and is not intended to be limiting of the claimed inventions. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

Overview

The present disclosure relates to a sustainable flood irrigation system that 1) regulates, using solar energy and at the times assigned by the water company, when each user within a common irrigation network receives water, 2) confirms that the flood irrigation valves open and close at the assigned times so everyone gets the water they are paying for, 3) significantly reduces the likelihood that water is wasted due to overflowing, and 4) significantly reduces the likelihood that property damage occurs from flooding due to missed gate times. Furthermore, the system is configured to create a record for customers that confirms that the water is turned on at the right time for each customer, and is turned off at the right time with visual and sensory proof that the water is off so that a customer can cause the flood irrigation water valve to open and close even when it is inconvenient for the customer, and know that the valve reliably opened and closed at the selected times.

The system may also be configured with a high-water alarm so that the system automatically closes the valve if the high-water alarm is triggered. Possible additional causes of a high-water alarm include, without limitation, faulty alarms, debris stuck under the valve preventing it from closing, rain or sprinkler water hitting the alarm sensor, and excessive flooding from neighboring yards. Upon valve closure due to a high-water alarm event, the system is designed to close the valve and generate a notice to the home-owner with a photo of the valve, and generate a notice to any monitoring company or service if there is one. A monitoring company or service, which may be independent or run by the water company, can arrange for an appropriate physical check of the water delivery to determine and remedy the problem for the specific customer with the alarm to reduce property damage in an emergency.

Although each unit of a sustainable residential yard flood irrigation valve safety system can operate completely independent of all other sustainable residential yard flood irrigation valve safety units within a common flood irrigation schedule, two or more, up to all of the residential yard flood irrigation valves may be adapted to include a valve safety unit and operate as a collective system in conjunction with each other.

Sustainable Valve Safety Units

In a basic embodiment, described with reference to FIGS. 1-6, a stand for a single unit 2 of the system includes a stand 4 with a lower bracket 6 configured to positionally fix the stand in relationship to the water flood irrigation feed pipe 12 of a traditional residential flood irrigation system. In particular embodiments, the lower bracket 6 may be configured as a ring clamp 10, as shown in FIGS. 1-6, that is sized to engage the outer diameter of the water flood irrigation feed pipe 12. In other embodiments, the lower bracket 6 may be configured to mount in the ground, such as through spikes or posts, adjacent to the water flood irrigation feed pipe 12 to maintain the stand's 4 positional relationship with the water flood irrigation feed pipe 12. In other embodiments, the lower bracket may otherwise clamp to the water flood irrigation feed pipe 12 to engage it. In particular embodiments, the lower bracket 6 includes at least one post receiver 8, an embodiment with two post receivers 8 is illustrated in FIG. 1 though only one may be used. At least one mounting post 18 may be received in the at least one post receiver 8, so that the mounting post 18 extends upward from the at least one post receiver 8 and lower bracket 6. In other embodiments, the at least one mounting post 18 may be otherwise affixed to the lower bracket 6, such as by welding or other method of affixing the at least one mounting post 18 to the lower bracket 6.

A driver support arm 22 may be pivotally attached to the mounting post 18. In other embodiments, the driver support arm 22 may be fixedly attached. Configuring the driver support arm 22 to pivot in relation to the mounting post 18 provides the advantage of being smaller for shipment and storage, and keeping the driver support arm 22 out of the way as the user is installing the unit in relation to the water flood irrigation feed pipe 12. Although the units 2 and parts described herein may be manufactured with varying dimensions depending upon the needs for a particular water flood irrigation feed pipe 12, it was found that for a traditional residential yard flood irrigation system in Arizona, a lower bracket 6 configured as a ring clamp 10 having an inner diameter of 0.3 meters (m) (12 inch), with an additional 0.23 m (9 inch) extension to support at least one 0.9 m (36 inch) mounting post, and a 0.34 m (13.5 inch) driver support arm, works well. The bolts on the ring clamp 10 may be tightened to secure the stand 4 to the water flood irrigation feed pipe 12.

Figure 5B:
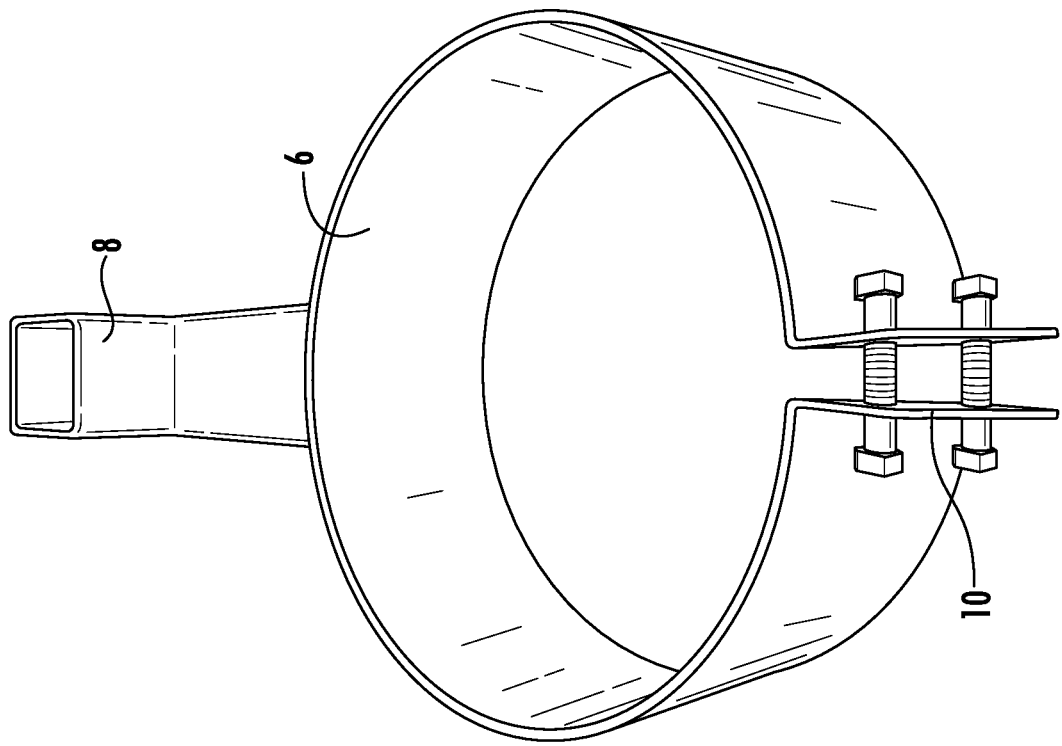
FIG. 5B is a perspective view of a lower bracket embodiment with one post receiver.
Figure 5A:
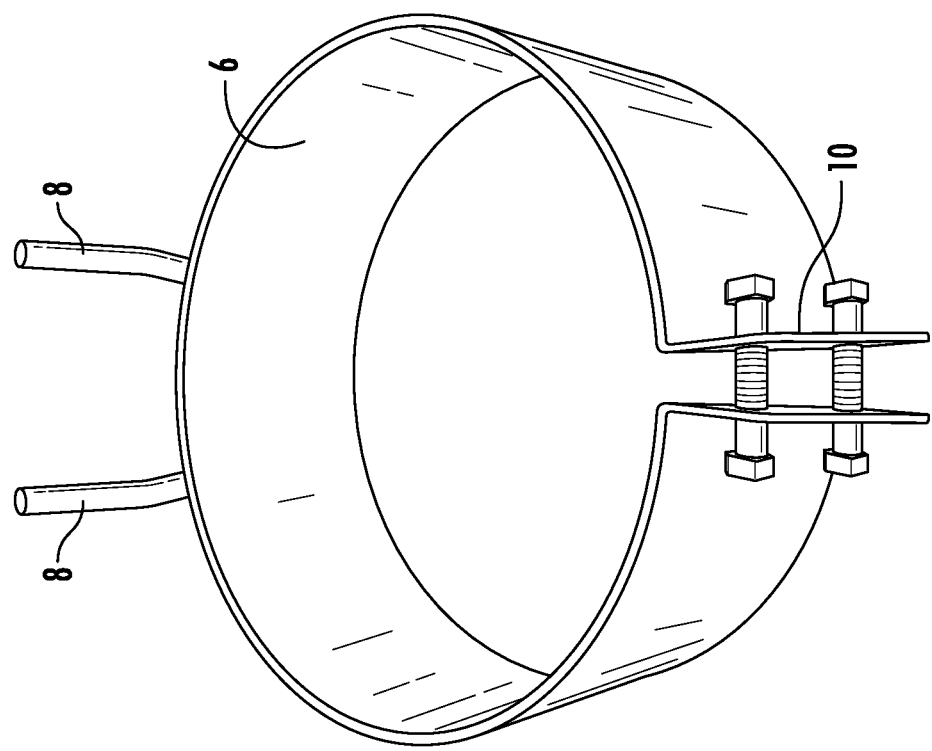
FIG. 5A is a perspective view of the lower bracket of FIG. 1.

FIG. 5A illustrates a lower bracket 6 configured as a ring clamp 10 with two post receivers 8. FIG. 5B illustrates a lower bracket 6 configured as a ring clamp 10 with only one post receiver 8. At least one post receiver 8, or at least one mounting post 18 is all that is needed, though more than one or even two may be used. Whether one mounting post 18 or two or more are used for a particular embodiment, an additional support handle 20 (FIGS. 2A-2B) may be included to assist the installer in manipulating the mounting post with its attached controller box 40, solar panel 48, and other components, such as a camera 50, water sensor 46, driver motor 32 and driver support arm 22, as the mounting post is placed into the at least one post receiver 8.

Figure 6:
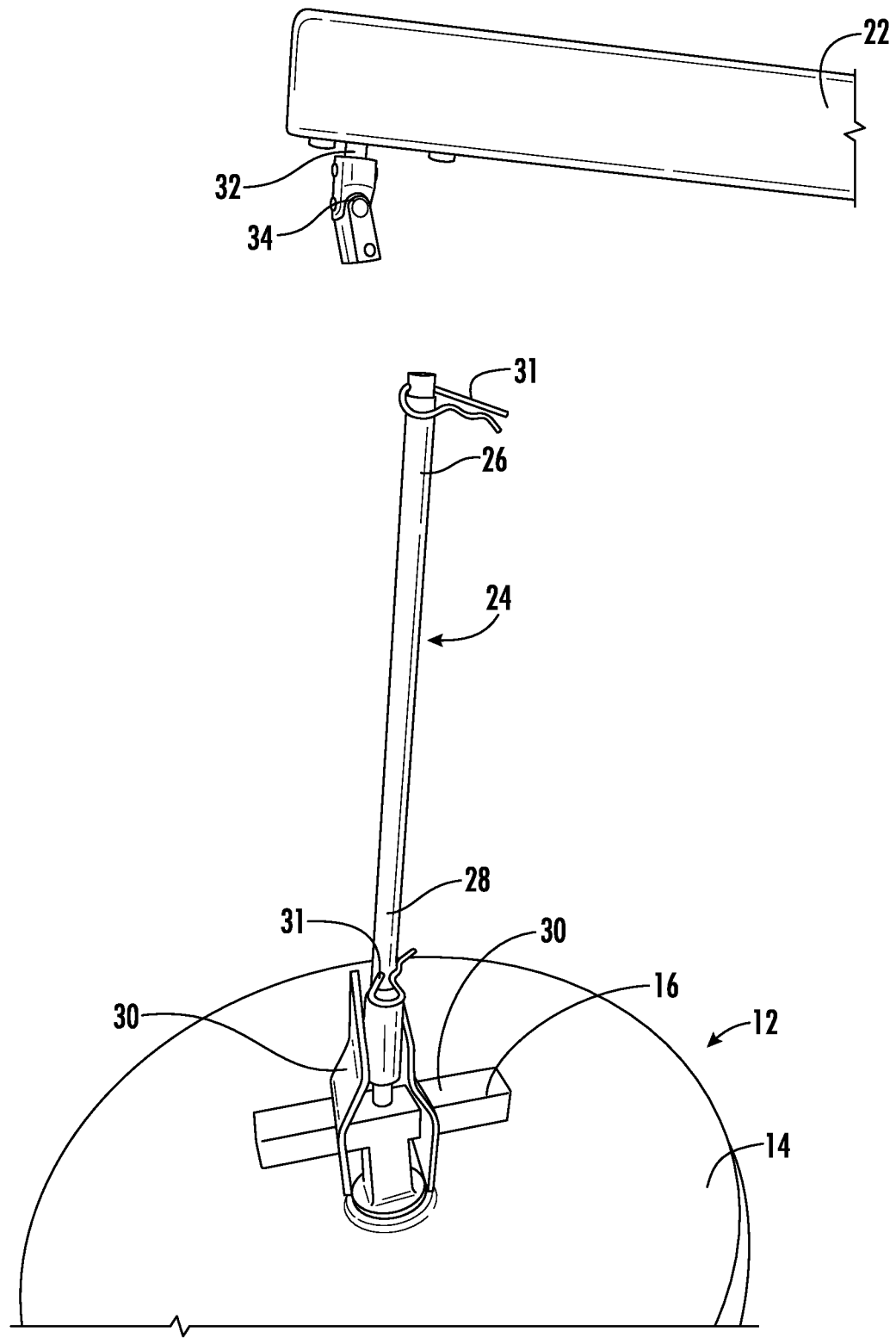
FIG. 6 is a close-up side view of the sustainable residential yard flood irrigation valve safety system unit of FIG. 1.

A driver motor 32 is mounted to the driver support arm 22. In the embodiment illustrated in FIGS. 1-6, the driver motor 32 is mounted within a cavity in the driver support arm 22 and the driver motor 32 post extends from the cavity. As best illustrated in FIG. 6, a universal joint 34, or other connector, may be connected to the driver motor 32 post, and a first end 26 of a driver arm 24 is coupled to the universal joint 34. By using a universal joint 34 between the driver motor 32 and the driver arm 24, the driver motor 32 does not need to be exactly lined up with the flood irrigation valve 14 manual twist handle 16 to enable the manual twist handle 16 to be rotated by the driver motor 32. Use of the universal joint 34 and an imprecise slot 30 within the connector at the second end 28 of the driver arm 24 enables the driver motor 32 to perform the rotating drive despite slight misalignments. Although other components may be used to connect the first 26 and second 28 ends of the driver arm to the adjacent pieces, the embodiment of FIG. 6 uses cotter pins 31 for easy, but secure, attachment and removal. The specific driver motor 32 used is not critical. However, a 12V, 5 rpm DC worm gear motor, such as that sold by Bringsmart (available on Amazon), works well.

Figure 8:
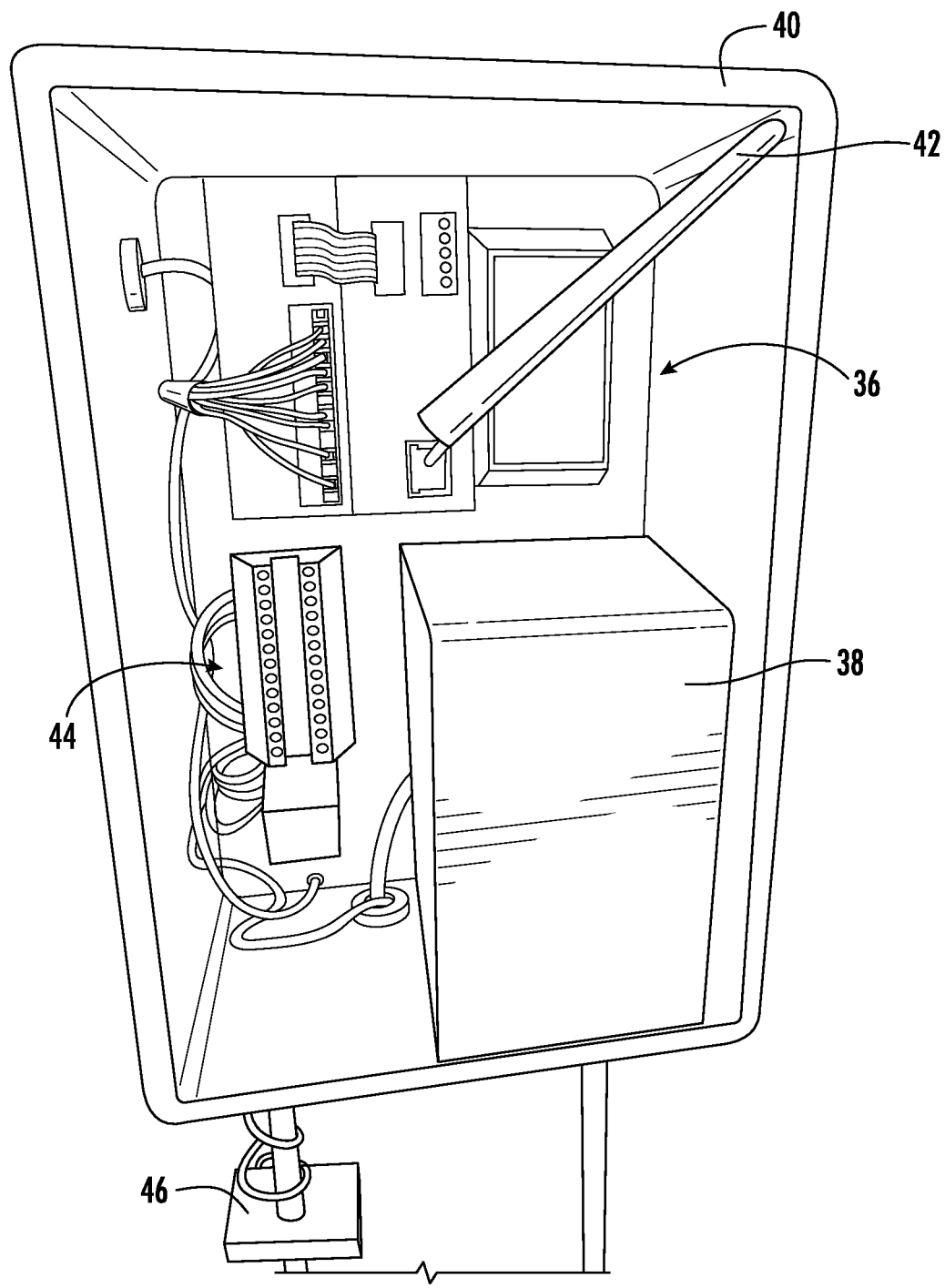
FIG. 8 is an illustration of an electronic controller in a controller box.

The driver motor 32 is driven by 12V power from the controller box 40 (FIG. 8). In this particular embodiment, the solar panel 48 (FIG. 1) gathers solar energy and stores it in the battery 38 (FIG. 8). The electronic controller 36 manages and maintains operation of the driver motor 32 in response to signals received through a wireless network through, for example, an antenna 42. Power wires extend from the electronic controller 36 in the controller box 40 to the driver motor 32. In the particular embodiment illustrated in FIGS. 1-6, the power wires extend through the driver support arm 22.

Although any wireless communication network may be used, for particular implementations such as the embodiments shown in FIGS. 1-8, the wireless communication network used is a cellular communication network. Connection to the cellular communication network is established as part of the electronic controller 36 circuitry within the controller box 40. Scheduling instructions and operation instructions can be downloaded to the electronic controller 36 circuitry within the controller box 40. Although alternative communication methods such as Wi-Fi or Bluetooth could alternatively be used, by using a cellular connection, even when a particular residence's power, and consequently their Wi-Fi, goes down, each unit 2 within the system can still communicate with a central control for reporting that the flood irrigation valve has been opened or closed. In particular embodiments, such as those illustrated in FIGS. 1-8, a video or still camera 50 may also be mounted on the stand 4 and electrically coupled to the electronic controller 36 circuitry to capture at least one or more live stream, video or still images of the flood irrigation valve 14 in its open and/or closed states as explained more below. A date and time stamp may be included with the electronic data for the at least one image as further evidence of when the image was captured.

To use a sustainable residential flood irrigation valve system unit, the stand 4 and attached equipment illustrated in FIGS. 1-8 are positionally fixed in relation to the water flood irrigation feed pipe 12. Once it is installed, a user would either communicate directly with the controller box using a mobile application on their phone and Bluetooth or Wi-Fi or cellular connection, or would visit a central control system associated with the flood irrigation valve controller through a website or mobile application to provide instructions for operating the sustainable residential flood irrigation valve system.

A user, logged into their account which is associated with one or more specific flood irrigation valves, chooses to schedule an irrigation. The user can then either choose their specific unit from a list already verified with their user account, or enter a Unit ID # and choose a start time and a duration or an end time. In particular embodiments, proposed start times and durations or end times may be suggested by the user's account based on scheduled times for receiving flood irrigation water at a particular valve.

Alternatively, in particular embodiments, a water company or other monitoring service may send notices directly to a plurality of sustainable residential flood irrigation valve systems to automatically schedule the valve system units for opening and closing at the times scheduled by the water company so that multiple units within a common flood irrigation watering circuit are turned on and off sequentially at appropriate times with documentation that they are appropriately being operated. In this embodiment, the residential home owner could pay for the system and the water company or other monitoring service could monitor the system and send instructions through cellular service for opening and closing the flood irrigation valves.

Figure 7B:
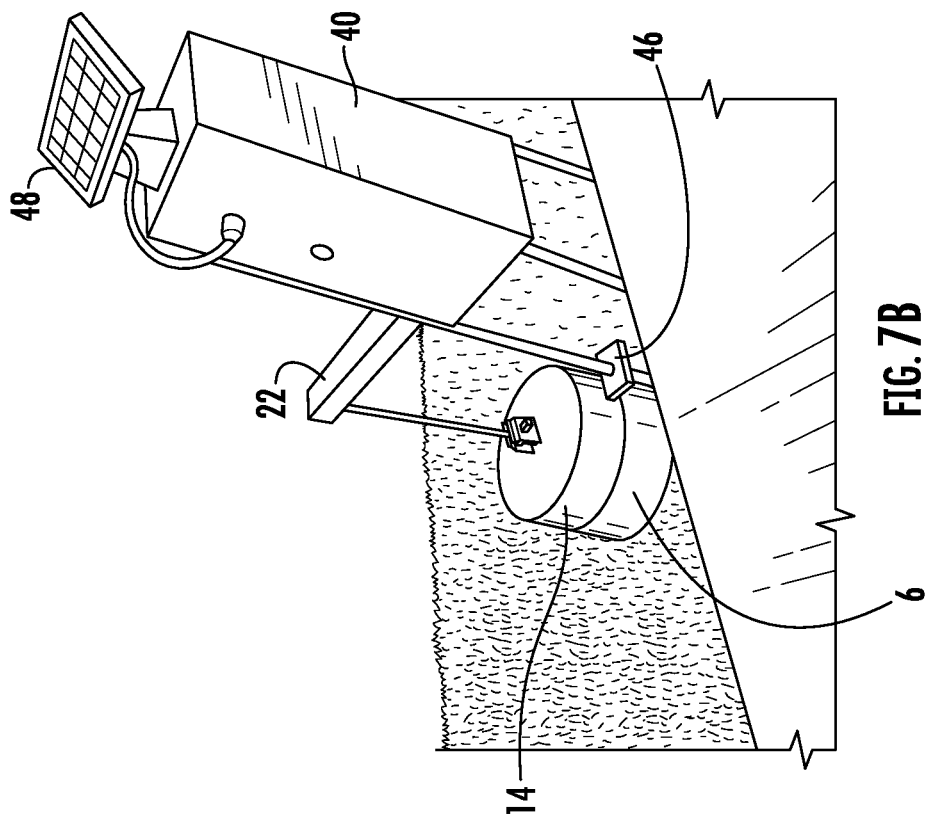
FIG. 7B is an illustration of the sustainable residential yard flood irrigation valve safety system unit of FIG. 1 showing the flood irrigation valve in an open state.
Figure 7A:
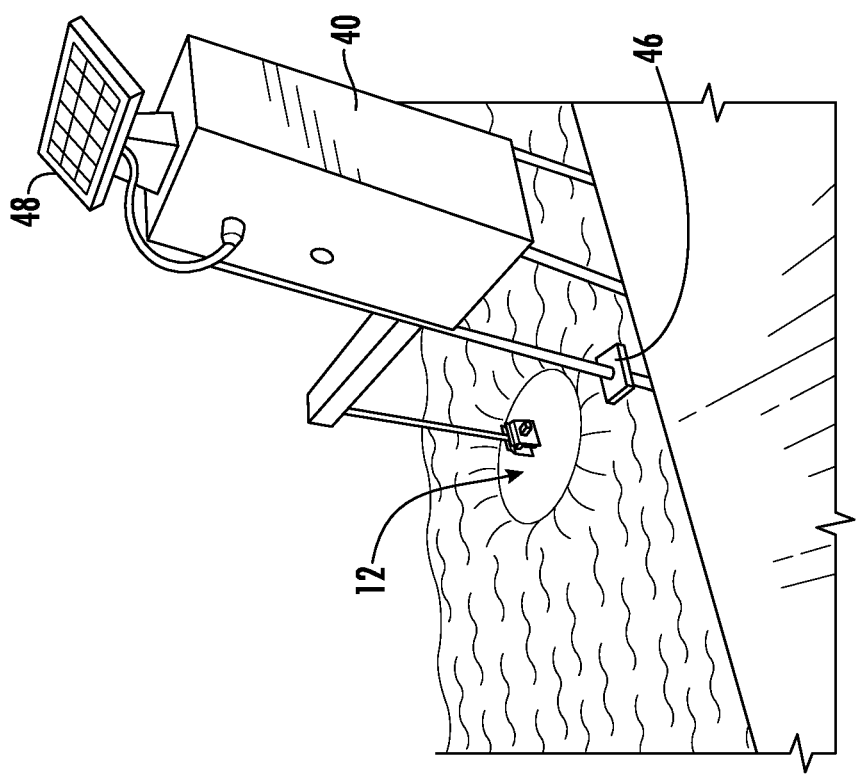
FIG. 7A is an illustration of the sustainable residential yard flood irrigation valve safety system unit of FIG. 1 showing the flood irrigation valve in a closed state.

At the particular time when the system is scheduled to open the flood irrigation valve, the electronic controller 36 in the controller box 40 provides power to the driver motor 32 from the battery 38 and the driver motor 32 rotates in an appropriate direction, such as counter-clockwise, to move the flood irrigation valve 14 from a closed condition (FIG. 7A) to an open condition (FIG. 7B). A camera 50 mounted on the unit 2, such as in a wall of the controller box 40, on the top of the controller box 40, or elsewhere on the stand 4, captures at least one image of the flood irrigation valve 14 and stores the image either in memory associated with the electronic controller 36 or in remote memory associated with the unit 2 and the owner's account. The image includes an associated time and date stamp to verify that the water was flowing and that the flood irrigation valve 14 was open at the scheduled time.

When the scheduled time to close the flood irrigation valve 14 is reached, the system is configured to provide power to the driver motor 32 causing the driver motor 32 to rotate in the opposite direction, such as clockwise, to close the flood irrigation flood irrigation valve 14. If a camera 50 is associated with the system, the electronic controller 36 may be configured to wait a predetermined time, such as 30 seconds or 1 minute, after the flood irrigation valve 14 is closed and capture another image to store in association with the scheduled close time and date to confirm that the water has stopped flowing and that the flood irrigation valve 14 is fully closed. A customer, or a water company, can use the stored images to confirm that water was turned on and off at the appropriate times, and confirm that the flood irrigation valve 14 fully closed the flood irrigation.

Another benefit enabled through the use of a camera 50 is that the system may be configured to allow a user or water company to access the camera 50 at any time through the wireless network to check the status of the flood irrigation valve 14, whether water is flowing from it, and what the water level is surrounding the flood irrigation valve 14. This is useful for when users are not home during a scheduled irrigation, or for a water company if a neighbor is complaining that they are not getting water, and someone needs to check if the flood irrigation valve 14 is open or whether an adjacent home's flood irrigation valve 14 is open, or if water is overflowing onto a particular property and flooding an area when the local flood irrigation valve 14 is closed.

Figure 9A:
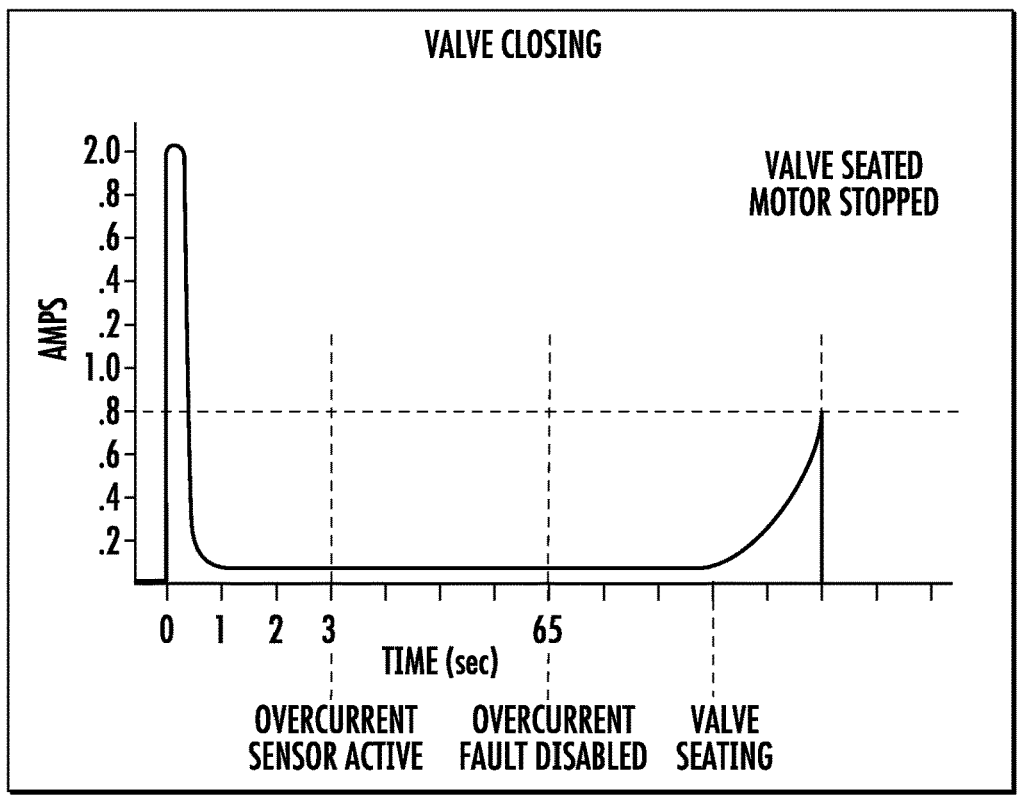
FIG. 9A is a current versus timing graph illustrating representative changes in current used to close the flood irrigation valve.
Figure 9B:
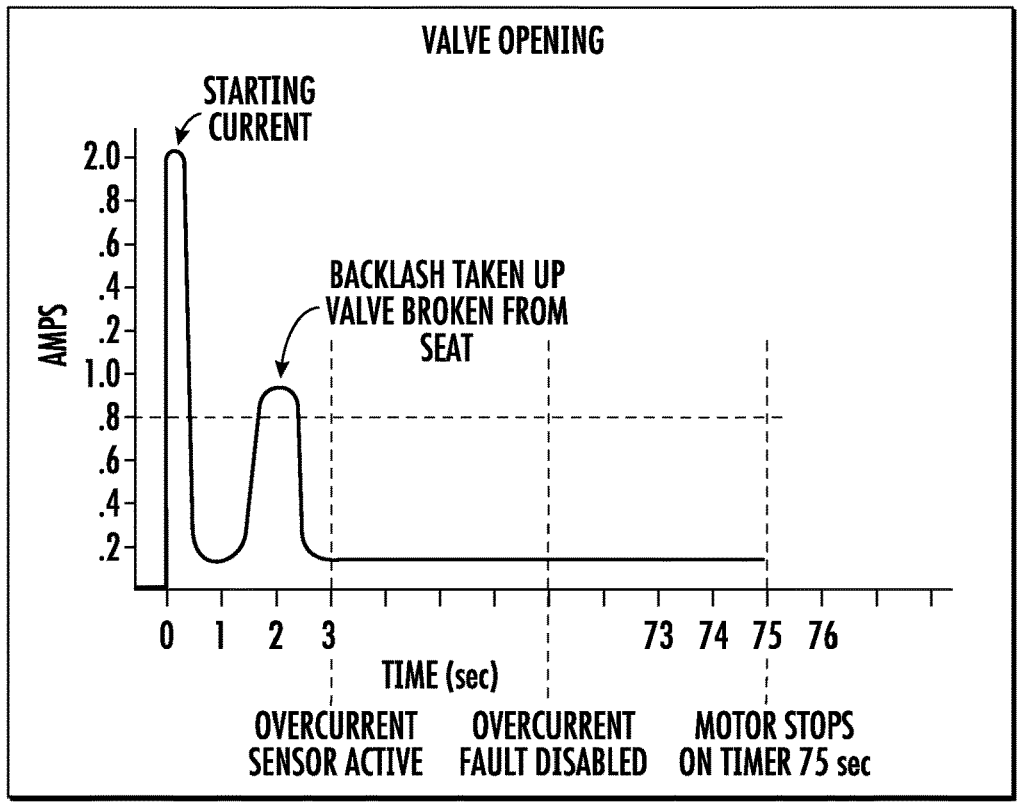
FIG. 9B is a current versus timing graph illustrating representative changes in current used to open the flood irrigation valve.

In addition to the camera 50 for confirming the flood irrigation valve 14 is closed, in particular embodiments, the electronic controller 36 may be configured to monitor the current required by the driver motor 32 to determine when the flood irrigation valve 14 is closed. For example, as shown in the graphs of FIGS. 9A and 9B, using the principle that the current used to drive the driver motor 32 is proportional to the resistance experienced by the driver motor as it rotates, the state of the flood irrigation valve 14 may be determined based on the known rotational direction and the relative amount of current required to drive the driver motor 32. When the flood irrigation valve 14 is fully closed, the resistance peaks above a particular predetermined value. The current sensor within the controller box 40 monitoring the current is configured to shut off the power and log the flood irrigation valve as closed when this happens as an additional confirmation, along with the photograph/video confirming that the valve is closed. This ensures water, and energy, is not wasted.

When the process for activating the driver motor 32 to close the flood irrigation valve is started, the current drawn by the driver motor 32, measured in Amps, increases to get the driver motor 32 started and to overcome initial friction of the flood irrigation valve 14. Once the flood irrigation valve 14 starts moving down, the power required to maintain its movement is much smaller. When the flood irrigation valve 14 begins seating, friction increases and the current required to rotate the flood irrigation valve 14 increases until it reaches a predetermined level (such as 0.8 Amps in the example of FIG. 9A), where it is determined that the flood irrigation valve 14 has completely closed and the driver motor 32 stops. By monitoring the current supplied to the driver motor 32, the unit 2 is able to provide an indicator that the current increased around the expected time and reached an expected level, as further confirmation that the flood irrigation valve 14 is closed.

When the flood irrigation valve 14 is opening, a similar process is followed, though confirmation of opening is less critical. When the process for activating the driver motor 32 to open the flood irrigation valve 14 is started, the current drawn by the driver motor 32, measured in Amps, increases to get the driver motor 32 started and to overcome initial friction of the flood irrigation valve 14. Once the flood irrigation valve 14 starts moving upward, the power required to maintain its movement is much smaller, but as the valve seat is broken (the valve lid separating from the valve seat), the friction again increases and greater current is required to break the seal. Then the driver motor 32 continues for a predetermined time, knowing that the valve is opening due to the valve seat friction levels being reached, and stops.

As a further safety device included to ensure too much water is not used at a particular residential yard which would result in flooding, a water sensor 46 is mounted to the stand at a desired maximum level. In particular implementations, a water alarm 44 associated with the water sensor 46 is configured to automatically trigger the flood irrigation valve 14 controller to close the flood irrigation valve 14 when the predetermined maximum level for the water sensor 46 is triggered. If it is not during a scheduled time to stop the water, the user and/or the water company may be directly notified that an unscheduled valve closure is required. If the flood irrigation valve 14 is closed and the water sensor 46 is still indicating that the water level is too high, the user and the water company may be notified directly to let the water company know there is a malfunction or that water is entering the user's property from another source, and to let the user know that the risk of flood is high and should be checked. Notices to the user for any of the notices identified herein, may be provided to the user's cell phone, such as by text or automated call, and/or by email to the user's email address, and/or through the user's account interface.

In addition to the system being sustainable through conserving and regulating water usage through more precise usage, it is also sustainable by being powered by solar energy. The battery 38 within the controller box 40 is charged through a solar panel 48 mounted on the unit 2. The battery 38 then provides power to the other parts of the unit 2, the electronic controller 36, the camera 50, the water alarm 44 and water sensor 46, and allows the electronic controller 36 to execute on its programming to open and close the flood irrigation valve 14 at scheduled times. Because the scheduled times generally occur with at least a week time between them, there is sufficient time for the solar panel 48 to recharge the battery 38.

Although the programming for the scheduling software and process for execution may be accomplished in many different ways, and the order of many of the steps may be rearranged and still provide a functional solution, here is a non-limiting example of how parts of the process may be accomplished for reduced power usage and sustainability:

Boot-up: Upon power up the controller sets a two (2) second timer that locks out any valve movements while it resets all registers to their ready to run values and clears any timer values.

Programming: May operate in multiple ways, but in one embodiment, the start date and time are set in the first scheduled task of the program. In another embodiment, the date and time along with the irrigation duration in minutes is transmitted, such as through a system called Modbus, from the website to the system controller registers, including a run day register, a run time register, and a run duration register (for minutes of irrigation). When the date and time match what was programmed in the scheduled task or the Modbus registers, notice may be sent to the user stating "Start Irrigation". Sensor power is turned on and the sensor power timer is set to keep it on for 8 hours. Flood irrigation valve direction relay is set to "open" for 75 minutes. Driver motor power is set to "run" for 75 minutes. Driver motor start timer for over current is set for two (2) minutes to allow for driver motor start current to subside. Driver motor overcurrent timer is set to 70 minutes. (This timer is the window of time within which an overcurrent condition indicates a jammed flood irrigation valve. Outside this window an overcurrent condition indicates the flood irrigation valve is closed.). A notice may then be sent indicating the "Valve is Opening". At the end of the 75 minute run, the flood irrigation valve direction relay is turned to "close", the driver motor power is turned off, and a notice may be sent indicating "Valve is Open". In particular embodiments, a photo is taken and stored or sent with the Valve is Open notice. In other particular embodiments, only the Valve is Open notice is sent to the user for the valve open process.

When the irrigation timer expires, a notice stating "Run Done" may be sent, the driver motor power is set to "run" for 78 minutes, the driver motor start timer for overcurrent is set for two (2) minutes to allow for the driver motor start current to subside, and the driver motor overcurrent timer is set to 70 minutes (this timer is the window of time within which an overcurrent condition indicates a jammed flood irrigation valve. Outside this window, an overcurrent condition indicates that the flood irrigation valve is closed). If there is an overcurrent condition after the two (2) minute driver motor start timer expires, but prior to the 70 minute driver motor overcurrent timer expiring, the flood irrigation valve direction relay is set to "close", the driver motor power is turned off, and a notice is sent stating "Jammed Valve". If an overcurrent condition after the two (2) minute motor start timer expires, and after the 70 minute driver motor overcurrent timer expires, the flood irrigation valve direction relay is set to "close", the driver motor power is turned off, and a notice may be sent stating the "Valve Seated" or "Valve is Closed". In particular embodiments, a photo is taken and stored or sent with the Valve is Closed notice. In other particular embodiments, only the Valve is Closed notice is sent to the user for the close process.

Functional Testing: at T=0 seconds: Activating the function test will sensor power set to "on" for 50 seconds, the flood irrigation valve direction relay is set to "open" for 10 seconds, and the driver motor power is set to "run" for 10 seconds. At T=10 seconds:, no flood irrigation valve movement for 10 seconds. At T=20 seconds, driver motor power is set to "run" for 20 seconds. If the flood irrigation valve closes into the seat, the driver motor overcurrent will cause it to stop. At T=40 seconds, no flood irrigation valve movement for 10 seconds. At T=50 seconds, sensor power is set to "off".

Re-run/Abort Irrigation: Activating less than three (3) seconds will cause the programmed flood irrigation to restart now. Activating greater than three (3) seconds will cause the flood irrigation timer to be set down to 1 second. When it reaches 0, it will cause a normal end of flood irrigation cycle to commence, closing the flood irrigation valve and sending the necessary notices.

It is also contemplated that other, more simple embodiments of a sustainable yard flood irrigation valve system with controller may be implemented that do not include all of the many conveniences of the above-described system. Some of these alternative embodiments and options may have been described above, as part of various implementations or embodiments.

One specifically contemplated implementation includes a flood irrigation valve system with controller that does not include an online controller or camera. A controller device may be mounted above a flood irrigation valve and include a manually programmable controller device at which a user can manually indicate a time, or a delay, at which the flood irrigation valve will be opened, and a time, or a delay, at which the flood irrigation valve will close. Although this implementation may be charged with a solar panel or other solar-charging option, instead of a solar-powered battery charger option, the battery may be configured to be chargeable from a nearby power source, such as a house, or include a removable battery that may be charged remotely and then inserted prior to the time to operate the flood irrigation valve. The manually operated controller may be configured to accept programming for only a single irrigation event at a time.

By a more specific example, the yard irrigation valve controller system may include a slot to receive a battery pack that may be re-charged remote from the yard irrigation valve hardware, like many cordless yard tools are currently charged. Then, on a day where a user desires yard irrigation event to occur, the battery unit may be installed into the yard irrigation valve controller system and the user may set a timer on the control unit for when the irrigation valve should open, and when it should close. At the selected time, or time delay, the yard irrigation valve controller system, as described previously, will open the flood irrigation valve, and then close it at the indicated time to manage an irrigation event. Because most yard irrigation events occur weeks apart, and often at inconsistent and irregular times, rather than on a regularly scheduled basis like some sprinkler systems occur, a removable battery is practical and allows a user to set the parameters for a specific current irrigation event.

In one particular embodiment, the yard irrigation valve hardware is fixedly mounted at each flood irrigation valve, and a removable electronic control unit is implemented that allows the valve controller system to be mounted to a particular valve operation hardware proximate (within a day of) the time of a desired flood irrigation event so that the portions of the sustainable yard flood irrigation valve system controller that are more heat sensitive may be removed after a flood irrigation event, or even used on a different flood irrigation valve on another day. In other use cases, a service may install a plurality of yard irrigation valve hardware systems within a neighborhood. When a scheduled flood irrigation event is about to occur for the neighborhood, the flood irrigation service may install removable control units at each home, programmed for their particular flood irrigation event time. When the flood irrigation event is completed for that neighborhood, the service workers may remove the removable control units and move them to another neighborhood scheduled for the new irrigation event for that separate neighborhood.

In another particular implementation, a sustainable yard flood irrigation valve system with controller includes a timer and sensor switch to open and close the flood irrigation valve as discussed previously, but each flood irrigation event is specifically scheduled at the controller rather than through a remote application. A rechargeable battery is maintained through a solar panel, such as a 10-Watt solar panel. A camera may be included to allow the user to capture at least one image, through streaming one or more photos or real-time videos, directly to their cellular phone or computer—rather than to a central storage location. One particular advantage of this type of system is that the homeowner is not tied to a remote service and can operate the system entirely on their own after installation.

In yet another, more interactive particular implementation, a sustainable yard flood irrigation valve system with controller uses a controller that may be programmed remotely through a mobile phone or computer and receives the flood irrigation using a cellular connection. Powered by a lithium battery that may be recharged using a solar panel, such as a 20-Watt solar panel, the controller sends the user email or text messages at various stages of the irrigation process. A camera associated with the controller at the irrigation site allows the user to stream real time video or photos to their phone or computer. The user can access a list of scheduled flood irrigations from previous dates and any future flood irrigation dates scheduled.

It will be understood that implementations of a sustainable yard flood irrigation valve system with controller include but are not limited to the specific components disclosed herein, as virtually any components consistent with the intended operation of various sustainable irrigation valve systems with controllers may be utilized. Accordingly, for example, it should be understood that while the drawings and accompanying text show and describe particular sustainable irrigation valve system with controller implementations, any such implementation may comprise any shape, size, style, type, model, version, class, grade, measurement, concentration, material, weight, quantity, and/or the like consistent with the intended operation of a sustainable irrigation valve system with controller.

The concepts disclosed herein are not limited to the specific sustainable irrigation valve systems with controllers shown and described herein. For example, it is specifically contemplated that the components included in particular sustainable irrigation valve systems with controllers may be formed of any of many different types of materials or combinations that can readily be formed into shaped objects and that are consistent with the intended operation of a sustainable irrigation valve system with controller. For example, the components may be formed of: rubbers (synthetic and/or natural) and/or other like materials; glasses (such as fiberglass), carbon-fiber, aramid-fiber, any combination therefore, and/or other like materials; elastomers and/or other like materials; polymers such as thermoplastics (such as ABS, fluoropolymers, polyacetal, polyamide, polycarbonate, polyethylene, polysulfone, and/or the like, thermosets (such as epoxy, phenolic resin, polyimide, polyurethane, and/or the like), and/or other like materials; plastics and/or other like materials; and/or any combination of the foregoing.

Furthermore, sustainable irrigation valve systems with controllers may be manufactured separately and then assembled together, or any or all of the components may be manufactured simultaneously and integrally joined with one another. Manufacture of these components separately or simultaneously, as understood by those of ordinary skill in the art, may involve 3-D printing, extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular sustainable irrigation valve system with controller implementations, it should be readily apparent that a number of modifications may be made without departing from the spirit thereof and that these implementations may be applied to other implementations disclosed or undisclosed. The presently disclosed sustainable irrigation valve systems with controllers are, therefore, to be considered in all respects as illustrative and not restrictive.

More specifically, this disclosure, its aspects and embodiments, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation. Many additional implementations are possible. Further implementations are included within the scope of the CLAIMS.

It will be understood that implementations of a sustainable residential yard flood irrigation valve system with controller include but are not limited to the specific components disclosed herein, as virtually any components consistent with the intended operation of various sustainable residential yard flood irrigation valve systems with controllers may be utilized. Accordingly, for example, it should be understood that, while the drawings and accompanying text show and describe particular sustainable residential yard flood irrigation valve system with controller implementations, any such implementation may comprise any shape, size, style, type, model, version, class, grade, measurement, concentration, material, weight, quantity, and/or the like consistent with the intended operation of a sustainable residential yard flood irrigation valve system with controller.

The concepts disclosed herein are not limited to the specific sustainable residential yard flood irrigation valve systems with controllers shown and described herein. For example, it is specifically contemplated that the components included in particular sustainable residential yard flood irrigation valve systems may be formed of any of many different types of materials or combinations that can readily be formed into shaped objects and that are consistent with the intended operation of a sustainable residential yard flood irrigation valve system with controller. For example, the components may be formed of: rubbers (synthetic and/or natural) and/or other like materials; glasses (such as fiberglass), carbon-fiber, aramid-fiber, any combination therefore, and/or other like materials; elastomers and/or other like materials; polymers such as thermoplastics (such as ABS, fluoropolymers, polyacetal, polyamide, polycarbonate, polyethylene, polysulfone, and/or the like, thermosets (such as epoxy, phenolic resin, polyimide, polyurethane, and/or the like), and/or other like materials; plastics and/or other like materials; composites and/or other like materials; metals, such as zinc, magnesium, titanium, copper, iron, steel, carbon steel, alloy steel, tool steel, stainless steel, spring steel, aluminum, and/or other like materials; and/or any combination of the foregoing.

Furthermore, sustainable residential yard flood irrigation valve systems with controllers may be manufactured separately and then assembled together, or any or all of the components may be manufactured simultaneously and integrally joined with one another. Manufacture of these components separately or simultaneously, as understood by those of ordinary skill in the art, may involve 3-D printing, extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular sustainable residential yard flood irrigation valve system with controller implementations, it should be readily apparent that a number of modifications may be made without departing from the spirit thereof and that these implementations may be applied to other implementations disclosed or undisclosed. The presently disclosed sustainable residential yard flood irrigation valve systems with controllers are, therefore, to be considered in all respects as illustrative and not restrictive.

We claim:

1. A sustainable residential yard flood irrigation valve safety system comprising:
   a lower ring bracket sized to fit around an outer diameter of a water flood irrigation feed pipe of a residential flood irrigation system, the lower ring bracket comprising at least one post receiver and a clamp configured to engage the water flood irrigation feed pipe;
   a mounting post engaged with the post receiver and extending upward from the lower ring bracket, the mounting post comprising a driver support arm pivotally attached to the mounting post and moveable between a retracted position and an extended position;
   a driver motor mounted to the driver support arm and configured to rotatably drive a first end of a driver arm removably coupled to the driver motor through a universal joint attached to the driver motor, wherein the driver arm comprises a slot at a second end configured to receive a manual twist handle of a flood irrigation valve of the residential flood irrigation system and rotate the manual twist handle as the first end of the driver arm rotates;
   an electronic controller configured to receive commands through a wireless communication network and to selectively activate and deactivate the driver motor and to cause the driver motor to selectively rotate in both clockwise and counterclockwise rotational directions in response to the received commands in order to move the flood irrigation valve of the residential flood irrigation system to either of a closed state and an open state;
   a camera, responsive to the electronic controller and coupled to the mounting post, the camera configured to capture at least one image of the flood irrigation valve at one or more predetermined select times in relation to the flood irrigation valve being moved toward at least its closed state;
   a water alarm configured, when the flood irrigation valve is open, to notify the electronic controller, the electronic controller further configured to:
      send a notice through the wireless communication network when the valve remains in its open state for a predetermined time after the driver motor selectively rotates to place the flood irrigation valve in the closed state; and
      automatically move the flood irrigation valve to its closed state when the water alarm indicates a water level about a water sensor has reached a predetermined height; and
   a solar panel configured to gather solar energy and store it in a battery associated with the electronic controller and the driver motor.

2. The sustainable residential yard flood irrigation valve safety system of claim 1, wherein the at least one image is at least one of a video image and a still image.

3. The sustainable residential yard flood irrigation valve safety system of claim 2, wherein each of the at least one image is associated with a date and time stamp as evidence of the open state or closed state of the flood irrigation valve.

4. The sustainable residential yard flood irrigation valve safety system of claim 1, wherein the electronic controller is further configured to send a notice through the wireless communication network when the valve is in its closed state and the water alarm indicates a water level about the water sensor has reached the predetermined height.

5. The sustainable residential yard flood irrigation valve safety system of claim 4, wherein when the electronic controller sends the notice that the valve is in its closed state and the water alarm indicates the water level about the water sensor has reached the predetermined height, the notice includes the at least one image.

6. The sustainable residential yard flood irrigation valve safety system of claim 1, wherein when the electronic controller sends the notice that the valve remains in its open state after the driver motor selectively rotated to place the flood irrigation valve in the closed state, the notice includes the at least one image evidencing whether the flood irrigation valve is releasing water.

7. A sustainable residential yard flood irrigation valve safety system comprising:
   a lower bracket configured to physically engage a water exit of a water flood irrigation feed pipe of a residential flood irrigation system, the lower bracket comprising at least one post receiver;
   a mounting post engaged with the post receiver and extending upward from the lower bracket, the mounting post comprising a driver support arm attached to the mounting post and moveable between a retracted position and an extended position;
   a driver motor mounted to the driver support arm and configured to rotatably drive a first end of a driver arm removably coupled to the driver motor through a universal joint attached to the driver motor, wherein the driver arm comprises a slot at a second end configured to receive a manual twist handle of a flood irrigation valve of the residential flood irrigation system and rotate the manual twist handle as the first end of the driver arm rotates;

an electronic controller configured to receive commands through a wireless communication network and to selectively activate and deactivate the driver motor and to cause the driver motor to selectively rotate in both clockwise and counterclockwise rotational directions in response to the received commands in order to move the flood irrigation valve of the residential flood irrigation system to either of a closed state in which flooding is stopped and an open state in which desirable flooding of an area surrounding the flood irrigation valve occurs from water exiting the water exit of the flood irrigation feed pipe to the area surrounding the flood irrigation valve;

a camera, responsive to the electronic controller and coupled to the mounting post, the camera configured to capture at least one image of the flood irrigation valve at one or more predetermined select times in relation to the flood irrigation valve being moved at least toward its closed state and initiate the at least one image being made available to a user to verify whether flooding of the area surrounding the flood irrigation valve continues or is stopped;

a water alarm configured to notify the electronic controller when a water level about a water sensor associated with the water alarm has reached a predetermined height, wherein the electronic controller is further configured to send a notice through the wireless communication network when the valve remains in its open state for a predetermined time after the driver motor selectively rotates to place the flood irrigation valve in the closed state; and a solar panel configured to gather solar energy and store it in a battery associated with the electronic controller and the driver motor.

8. The sustainable residential yard flood irrigation valve safety system of claim 7, wherein the at least one image is at least one of a video image and a still image.

9. The sustainable residential yard flood irrigation valve safety system of claim 8, wherein each of the at least one image is associated with a date and time stamp as evidence of the open state or closed state of the flood irrigation valve.

10. The sustainable residential yard flood irrigation valve safety system of claim 7, wherein the lower bracket is sized to fit around an outer diameter of the water flood irrigation feed pipe.

11. The sustainable residential yard flood irrigation valve safety system of claim 7, wherein the driver support arm is moveable between a retracted position and an extended position.

12. The sustainable residential yard flood irrigation valve safety system of claim 7, the electronic controller further configured to send a notice through the wireless communication network when the valve remains in its open state for a predetermined time after the driver motor selectively rotates to place the flood irrigation valve in the closed state.

13. The sustainable residential yard flood irrigation valve safety system of claim 12, wherein when the electronic controller sends the notice that the valve remains in its open state for the predetermined time after the driver motor selectively rotates to place the flood irrigation valve in the closed state, the notice includes the at least one image.

14. The sustainable residential yard flood irrigation valve safety system of claim 7, wherein the electronic controller is configured to automatically move the flood irrigation valve to its closed state when the water alarm indicates the water level about the water sensor has reached the predetermined height.

15. A sustainable residential yard flood irrigation valve safety system comprising:

a lower bracket configured to positionally fix the sustainable residential yard flood irrigation valve safety system in relation to a water exit of a water flood irrigation feed pipe of a residential flood irrigation system on which a flood irrigation valve sits;

a mounting post extending upward from the lower bracket, the mounting post comprising a driver support arm attached to the mounting post;

a driver motor coupled to the driver support arm and configured to rotatably drive a first end of a driver arm extending downward from the driver support arm, a second end of the driver arm configured to engage a manual twist handle of a flood irrigation valve of the residential flood irrigation system and rotate the manual twist handle as the first end of the driver arm rotates;

an electronic controller configured to selectively operate the driver motor to selectively rotate the driver motor in either a clockwise or a counterclockwise rotational direction to move the flood irrigation valve to either of a closed state in which the flood irrigation valve blocks water from exiting the residential flood irrigation system or an open state in which water exits the residential flood irrigation system from water exiting the water exit of the flood irrigation pipe and intentionally floods an area surrounding the flood irrigation valve;

a water alarm configured to indicate when a water level about a water sensor associated with the water alarm has reached a predetermined height as the water floods the area surrounding the flood irrigation valve and initiate a notice through the electronic controller that the water level has reached the predetermined height; and a solar panel configured to gather solar energy and store it in a battery associated with the electronic controller and the driver motor.

16. The sustainable residential yard flood irrigation valve safety system of claim 15, further comprising a camera coupled to the mounting post and configured to capture at least one of a video image and a still image of the flood irrigation valve at one or more predetermined select times in relation to the flood irrigation valve being moved toward at least one of its open state and its closed state and initiate the at least one image being made available to a user to verify whether flooding of the area surrounding the flood irrigation valve continues or is stopped.

17. The sustainable residential yard flood irrigation valve safety system of claim 15, the electronic controller further configured to send a notice through a wireless communication network when the valve remains in its open state for a predetermined time after the driver motor selectively rotates to place the flood irrigation valve in the closed state.

18. The sustainable residential yard flood irrigation valve safety system of claim 17, wherein when the electronic controller sends the notice that the valve remains in its open state for the predetermined time after the driver motor selectively rotates to place the flood irrigation valve in the closed state, the notice includes the at least one of the video image and the still image.

19. The sustainable residential yard flood irrigation valve safety system of claim 15, wherein the electronic controller is configured to automatically move the flood irrigation valve to its closed state when the water alarm indicates the water level about the water sensor has reached the predetermined height.

20. The sustainable residential yard flood irrigation valve safety system of claim 15, wherein the driver support arm is moveable between a retracted position and an extended position.

\* \* \* \* \*